United States Patent [19]

Blumke et al.

[11] 3,815,127

[45] June 4, 1974

[54] DATA ENTRY DEVICE

[75] Inventors: Eugene G. Blumke, Bloomington; Kenneth N. Bergan, Burnsville, both of Minn.

[73] Assignee: Control Data Corporation, Minneapolis, Minn.

[22] Filed: Mar. 20, 1973

[21] Appl. No.: 343,074

[52] U.S. Cl. .......................... 340/365 S, 340/365 C

[51] Int. Cl. .......................... H04l 15/06

[58] Field of Search .......................... 340/365 S, 365 C

[56] References Cited

UNITED STATES PATENTS

| | | | |
|---|---|---|---|
| 3,538,256 | 11/1970 | Lucas | 340/365 S |
| 3,676,615 | 7/1972 | Wiedmer | 340/365 S |
| 3,760,409 | 9/1973 | Ruben | 340/365 S |

*Primary Examiner*—Thomas B. Habecker

*Attorney, Agent, or Firm*—Robert M. Angus; Joseph A. Genovese

[57] ABSTRACT

A data entry device comprises a plurality of pairs of sensors connected to a like plurality of bridge arrangements so that actuation of one of said pair of sensors unbalances the respective bridge in one state and actuation of the other of said pair of sensors unbalances the respective bridge in an opposite state. Scanner means is provided to sequentially scan the bridges to provide signals whose amplitudes are representative of the state of balance or unbalance of the respective bridges and whose phase is representative of the sense of unbalance. A level detector is provided to sense the amplitude of signals from the scanner to provide an output signal indicative of the unbalanced bridge, and a phase detector is provided to sense the phase of signals to provide an output signal representative of the state of unbalance.

15 Claims, 1 Drawing Figure

PATENTED JUN 4 1974
3,815,127
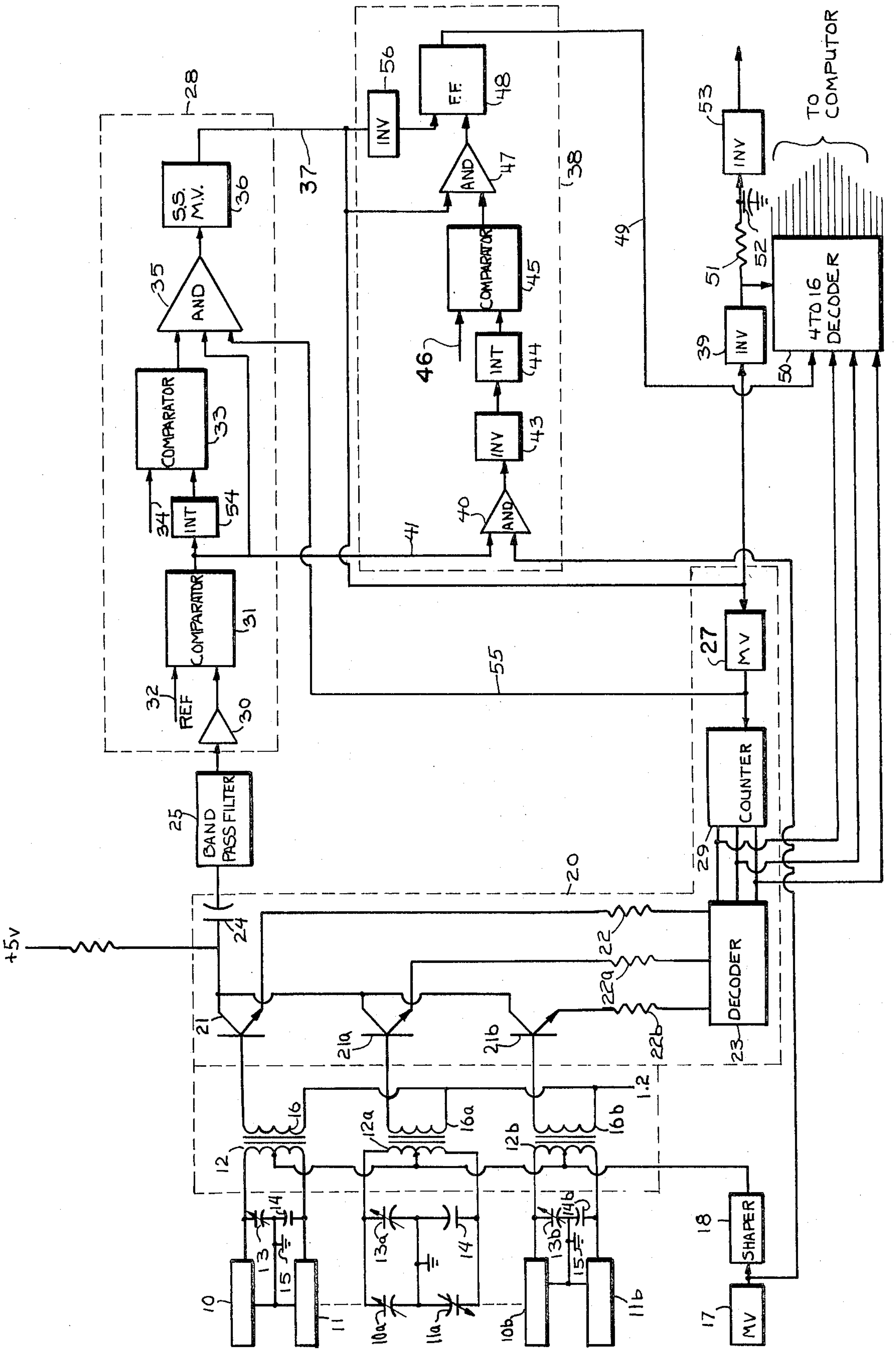

DATA ENTRY DEVICE

This invention relates to data entry devices for computers, and particularly to touch entry data input devices for use with an output display device, such as a cathode ray tube.

Heretofore, touch entry data input devices have been characterized in the provision of a plurality of sensors arranged in a matrix, and ordinarily disposed contiguous to a display device such as a screen of a cathode ray tube. A decoder matrix was provided to decode the sensor matrix and apply appropriate signals to an output device, such as a computer, indicative of which of the sensors have activated. Typically, each sensor was a switch device or an electrical sensor. For example, some sensors utilized a light matrix comprising a plurality of orthogonal light beams intersecting each other to define a matrix of intersection regions. A probe or other device applied to an intersection region blocked light in two orthogonal paths, thereby actuating a pair of light sensors. A decoder matrix determined the location of the actuated region from the two actuated sensors. An example of this class of device may be found at page 493 of Volume 9, Number 5, IBM Technical Disclosure Bulletin (Oct. 1966). Other sensors utilized a variation in electrical properties of a device for actuation. For example, a conductive membrane connected to a decoder matrix could be operated by a special probe, as shown in U.S. Pat. No. 3,440,522.

One problem associated with prior touch entry data input devices reside in the fact that complex decoding matricies were required to decode the sensor matrix to determine which sensor region was operated. The number of switches associated with the decoder matrix had to at least equal the number of sensor regions, and complex driver circuits were necessary to assure proper power considerations for the entire matrix. Further, such matricies are ordinarily relatively slow in operation, as compared to other data input devices for computers. Further, since some data entry devices required special probes for activation of the data entry device, it was necessary to provide special circuits for the probe.

It is an object of the present invention to provide a touch entry data input device which does not require an electronic probe for activation of the data entry device.

Another object to the present invention is to provide a touch entry data input device for a computer wherein a single sensor, when activated, provides the input for the data entry device.

It is yet another object to the present invention to provide a data entry device having a plurality of sensors, each individually representative of a unique region on a panel or the like, in which activation of a single sensor unbalances a Wheatstone bridge arrangement or the like for operation on a decoder.

Another object to the present invention is to provide a data entry device having a plurality of pairs of sensors coupled to a like plurality of bridge arrangements, and having a decoder device responsive to the unbalance of any one bridge to provide information indicative of which pair of sensors contains the actuated sensor.

Another object of the present invention is to provide a phase-responsive decoder system for a touch entry data input device wherein the decoder mechanism is responsive to the operation of either one of a pair of sensors to provide information as to which one of the pair of sensors has been operated.

In accordance with the present invention a plurality of pairs of sensors are coupled to an input circuit arranged to provide a signal indicative of which pair contains an actuated sensor. The signal from the input circuit is at a phase representative of the actuated one of the pair of sensors. Decoder means, responsive to the signal and its phase provides output signals representative of the actuated sensor.

One feature of the present invention resides in the provision of a plurality of bridge arrangements each connected to a pair of sensors and capable of being unbalanced in opposite senses in response to actuation of the individual sensors. An input circuit operates on the bridges to provide signals unique to each bridge (and hence, each pair of sensors). The phase of the signal is representative of which of the pair of sensors has been actuated.

Another feature of the present invention resides in the provision of a decoder circuit and a comparator to determine which bridge is unbalanced, and a phase detector to determine the sense of unbalance of the bridge.

The above and other features of this invention will be more fully understood from the following detailed description and the accompanying drawings, in which the single FIGURE is a block circuit diagram of a touch entry data input device in accordance with the presently preferred embodiment of the present invention.

Referring to the drawing there is illustrated a block circuit diagram of a touch entry data input device in accordance with the presently preferred embodiment of the present invention. The data input device includes a plurality of touch entry sensors, 10, 11, 10*a*, 11*a*, 10*b*, 11*b*, etc. As shown particularly with respect to sensors 10*a* and 11*a*, the sensors may be variable capacitors connected to each other and to opposite sides of a primary winding 12, 12*a*, 12*b*, etc. It is to be understood, however, that sensors 10, 11, etc., may be any suitable type of variable electronic element, such as variable resistors, capacitors, and the like. Variable capacitors 13, 13*a*, 13*b*, etc., are connected in parallel with sensors 10, 10*a*, 10*b*, etc., respectively, and fixed capacitors 14, 14*a*, 14*b*, etc. are connected in parallel with sensors 11, 11*a*, 11*b*, etc., respectively. The common junction between sensors 10 and 11 and between capacitors 13 and 14 are connected to ground 15. Secondary windings 16, 16*a*, 16*b*, etc. are magnetically coupled to respective primary windings 12, 12*a*, 12*b*, preferrably by an iron core, not shown.

Multivibrator 17 provides output signals at a predetermined frequency, for example, about 7.5 KHz. Signal shaper 18 converts the output of multivibrator 17 to a sinusoidal signal to provide winding driving signals to the center tap of each of primary winding 12, 12*a*, 12*b*, etc. Windings 12, 16, etc., form a signal input circuit for scanner 20.

As shown particularly with respect to sensors 10*a* and 10*b*, winding 12*a* and capacitors 13*a* and 14*a* together form a Wheatstone bridge which is unbalanced by an alteration of the capacitance of either of sensors 10*a* and 10*b*. As will be more fully understood hereinafter, the amplitude of the signal from the signal input circuit for each respective pair of sensors 10a and 11a drives one of the transistors of the scanner circuit, but the phase of this signal is unique the operated sensor. One side of winding 16, 16*a*, 16*b* etc. is connected to a bias source while the opposite side thereof is connected to the base of the respective one of transistors 21, 21*a*, 21*b*, etc. The emitter of each of transistors 21 is connected through a resistor 22, 22*a*, 22*b* to the output of decoder 23. The collectors of transistors 21, 21*a*, 21*b*, etc. are connected together and through capacitor 24 to band pass filter 25. The collectors of transistors 21 are also connected through resistor 26 to a source of power. Scanner 20 further includes a multivibrator 27, which, as will be more fully understood hereinafter, is gated by an output of level detector 28. Multivibrator 27 provides an output to counter 29 which drives decoder 23.

In the circuit shown in the drawings, up to sixteen sensors may be utilized arranged in eight pairs to drive eight transistors 21. Hence, there are eight outputs from decoder 23 to the emitters of transistors 21. Counter 29 has three outputs driving decoder 23, each of these outputs being representative of a binary level ($2^0$, $2^1$, $2^2$). Thus, counter 29 is capable of counting between binary 000 and binary 111 (eight places) to drive decoder 23 to provide signals to successive outputs thereby activating successive transistors 21.

Level detector 28 includes an amplifier 30 connected to the output of band pass filter 25 which provides an input to comparator 31. A second input 32 provides a reference signal level to comparator 31. The output of comparator 31 is connected to integrator 54 which in turn provides a first input to comparator 33. Comparator 33 has a second input 34 connected to a reference source. The output of comparator 33 is connected to one input of AND gate 35. A second input of AND gate 35 is connected to the output of comparator 31, and a third input of AND gate 35 is connected via lead 55 to the output of multivibrator 27. AND gate 35 provides an output to single shot multivibrator 36 which in turn provides an output via channel 37 to multivibrator 27, and to phase detector 38. Channel 37 also provides an output to inverter 39 of an output circuit to be described in detail hereinafter.

Phase detector 38 includes an AND gate 40 having a first input 41 connected to the output of comparator 31 of level detector 28 and a second input 42 connected to the output of multivibrator 17. AND gate 40 drives inverter 43 which in turn drives integrator 44 to provide a first input to comparator 45. Comparator 45 has a second input 46 connected to a source of reference voltage. Comparator 45 provides an output to a first input of AND gate 47 which in turn has a second input connected to channel 37 and to the output of single shot multivibrator 36. AND gate 47 drives a first input to flip flop 48. A second input of flip flop 48 is connected through inverter 56 to single shot multivibrator 36. Flip flop 48 provides an output via channel 49 to decoder 50 of the output circuit.

Decoder 50 has four inputs, three of which are connected to separate ones of the outputs of counter 29 in scanner 20, and the fourth is connected via channel 49 to flip flop 48. Decoder 50 is a four-to-sixteen decoder capable of decoding four binary inputs to select one of 16 outputs. Decoder 50 is gated by the output from inverter 39, which in turn receives its input from single shot multivibrator 36 via channel 37. Inverter 39 provides an output through an integrator formed by resistor 51 and capacitor 52 to inverter 53 which in turn provides gate signal output to the key-on circuits associated with the computer.

In operation of the apparatus, multivibrator 17, which is a free running multivibrator provides output pulses at a frequency of about 7.5 KHz. Signal shaper 18 receives the output from multivibrator 17 and supplies 7.5 KHz sinusoidal driving signals to windings 12, 12*a*, 12*b*, etc. In the case of sixteen sensors, there will be eight windings 12, 12*a*, 12*b*, etc. In addition, the 7.5 KHz sinusoidal signals are applied via lead 42 to AND gate 40 in phase detector 38. Upon an unbalance of a bridge formed by winding 12 and capacitors 13 and 14, as would be occasioned by a change in the capacitance of either 10 or 11, the flow of current through the winding 12 induces a sinusoidal signal to the corresponding secondary winding 16. The amplitude of this sinusoidal signal induced in winding 16 is dependent upon the degree of unbalance of the bridge circuit, while the phase of the sinusoidal signal induced in secondary winding 16 will either be in phase or 180° out of phase with the sinusoidal primary driving signal from signal shaper 18, depending upon which sensor caused the unbalance. Thus, if a capacitor 10 caused the unbalance of the bridge, the signal induced in winding 16 is in phase with the signals from signal shaper 18, whereas if a capacitor 11 caused the bridge unbalance, the signal induced in winding 16 is 180° out of phase with the signal from signal shaper 18. The signal induced in a winding 16 is applied to the base of the respective transistor 21. This signal, of course, will either be in phase or out of phase with the sinusoidal signal from signal shaper 18, depending on which of the sensors 10 and 11 associated with the particular transistor has been actuated.

Counter 29 provides three outputs (in the case of sixteen sensors and eight transistors 21) thereby providing successive binary codes indicative of a binary count. Thus, counter 29 provides successive codes over its three lead output of 000, 001, 010, etc. through 111. Therefore, there are eight combinations of count signals available from counter 29 which are decoded by decoder 23 to provide successive outputs to each transistor 21. In the case of npn transistors as shown in the drawing, an activated transistor 21 will conduct when ground is supplied to its emitter. Hence, decoder provides one ground output and seven positive outputs, thereby selecting one transistor. When a ground output is provided to a transistor having an unbalance signal at its base, for example transistor 21*a*, that transistor is activated to complete a circuit path to band pass filter 25. Since the base of transistor 21 is driven by the sinusoidal signal induced in winding 16*a*, the signal appearing at the input to band pass filter 25 is a 7.5 KHz sinusoidal signal, and is either in phase or out of phase with the signal from signal shaper 18, depending which of sensors 10*a* and 11*a* is actuated.

It is to be understood that a circuit arrangement may be provided using positive signals to drive the transistors instead of ground, such as by using pnp transistors instead of npn transistors. Band pass filter 25 is tuned to pass signals at about 7.5 KHz. Thus, the signal passed by band pass filter 25 are amplified by amplifier 30 and supplied to comparator 31 where it is compared against a reference level applied at input 32. In this case, since it has been assumed that the transistor 21*a* is being driven by an unbalance signal from winding 16*a*, comparator 31 determined that an unbalanced condition occurs thereby causing an output to be applied to integrator 54 and to AND gate 35. Integrator 54 integrates the signal output and applies the result to comparator 33 which compares the integrated signal to a reference voltage. The output of comparator 33 is then applied to AND gate 35.

Integrator 54 has a predetermined time constant, for example 3 msec. Consequently, integrator 54 and comparator 33 operate as a delay network which sense the presence of an unbalance condition for some period of time, for example three milliseconds, so that if the unbalance occurs for that length of time, AND gate 35 is actuated by comparators 31 and 33 and multivibrator 27 to drive single shot multivibrator 36. Multivibrator 27, which operates decoder 23 and transistor 21, has a pulse duration longer than that of integrator 54 (such as 8 msec.)

Single shot multivibrator 36 is a retriggerable single shot multivibrator which provides output signals only when it receives an input signal at a rate faster than some predetermined time constant. For example, multivibrator 36 may have a time constant of 1.2 msec. and may provide an output pulse only if receiving pulses having a duration shorter than 1.2 msec. During a balance state of a sampled transistor 21, AND gate 35 is not actuated, thereby inactivating multivibrator 36 to a zero state. However, when an unbalance signal drives transistor 21 at 7.5 KHz to provide 7.5 KHz signals (133 $\mu$sec. rate) through AND gate 35, multivibrator 36 is actuated to provide a logical one output to multivibrator 27 thereby inhibiting further operation of the multivibrator. Hence, the binary count from counter 29 appearing at its three lead output remains at the count of the actuated transistor. Also, single shot multivibrator 36 actuates inverter 39 to provide a gate signal to decoder 50. Decoder 50, being actuated by the output from inverter 39, receives an input from counter 29 representative of the count appearing therein which corresponds to the actuated transistor 21. Thus, the three inputs from counter 29 to decoder 50 provide information as to which pair of sensors contains the actuated sensor.

The output from comparator 31 is also applied via lead 41 to AND gate 40, which receives its other input from multivibrator 17. Since the frequencies of the sinusoidal signals on lines 41 and 42 are the same, AND gate 40 will only operate if the signals are in phase. Therefore had sensor 10*a* been the capacitor that was actuated, the signals on lines 41 and 42 would be in phase and AND gate 40 will be operated to provide a signal to inverter 43. However, had sensor 11*a* been actuated, the signals appearing on lines 41 and 42 would not be in phase and AND gate 40 will not be operated. Assuming that capacitor 10*a* was the sensor that was actuated, AND gate 40 is operated, and its output is inverted and integrated and applied to comparator 45 which compares the signal with a reference level appearing at its input 46. The output from comparator 45 is applied as an input to AND gate 47 which receives a second input from level detector 28. Since the signal appearing on line 37 is of relatively long duration compared to the output from comparator 35, and since the signal appearing on line 37 is indicative of an unbalance condition, AND gate 47 is operated, thereby setting flip flop 48 to provide an output to decoder 50. Conversely, had AND gate 40 not been operated, flip flop 48 would not be set so that a logical zero would be provided via lead 49 to decoder 50.

After multivibrator 27 is cleared (by means not shown) allowing continued counting by counter 29 and sampling of other transistors 21, AND gate 35 is de-activated thereby de-activating multivibrator 36. Multivibrator 36 thus provides a logical zero output to inverter 56 to reset flip flop 48 if it was set.

As the result of the inputs from counter 29 and flip flop 48 to decoder 50, the decoder receives four inputs, the first three being indicative of a pair of sensors and the fourth being indicative of the actuated sensor of that pair. Decoder 50 decodes the four inputs, which appear in binary form 0000, 0001, etc., through 1111 to select one of 16 outputs to the computer. Also, the signal appearing on line 37 indicative of an actuated sensor is passed through invertor 58 to provide suitable key down gate controls for the computer.

The present invention thus provides a touch entry data input device requiring fewer electronic components from prior entry data devices. In this regard, the number of switching transistors necessary to sense the condition of a particular sensor is less than that in prior data entry devices. The apparatus is efficient in operation and requires little maintenance, and yet is reliable in operation and requires little operator interface. No special probes or other electronic apparatus are necessary in order to operate the sensors, as the sensors may be any suitable sensors operable in response to the touch of an operator. For example, the sensors may be touch operable capacitors disposed contiguous to the face of a data read-out device, such as a cathode ray tube.

This invention is not to be limited by the embodiment shown in the drawing and described description, which is given by way of example and not of limitation, but only in accordance with the scope of the appended claims.

What is claimed is:

1. A data entry device comprising a plurality of pairs of sensors; input circuit means connected to each of said pairs of sensors, said input circuit means having a plurality of outputs, each output being associated with one pair of sensors, said input circuit means being responsive to the actuation of a sensor to provide a first signal at the output associated with the pair of sensors containing the actuated sensor, said first signal having a characteristic representative of the actuated one of the respective pair of sensors; level detector means; scanner means connected between said input circuit means and said level detector means for sequentially scanning said plurality of outputs of said input circuit means to provide said first signals to said level detector means; said level detector means being responsive to said first signal for detecting the pair of sensors containing the actuated sensor; output means responsive to operation of said level detector means and said scanner means for providing a first output signal representative of the pair of sensors containing the operated sensor; and characteristic detector means responsive to the said characteristic of said first signal for providing a second output signal representative of the actuated sensor of said pair of sensors.

2. A data entry device according to claim 1 wherein said input circuit means includes a plurality electric bridge means, a first of each pair of sensors being connected to one leg of a respective bridge means and operable to unbalance the respective bridge means in a first sense and a second of each pair of sensors being connected to a second leg of the respective bridge means and operable to unbalance the respective bridge means in a second sense different from said first sense, said scanner means being operable to sequentially scan said bridge means to provide sequential first signals, said first signals having an amplitude representative of the unbalance or balance of a respective bridge means and a phase representative of the sense of unbalance.

3. A data entry device according to claim 2 further including inhibit means responsive to said level detector means for inhibiting operation of said scanner means when said level detector means detects a signal amplitude representative of an unbalanced bridge means, said scanner means including counter means providing a count signal indicative of the bridge means being scanned, said output means being responsive to said count signal and to operation of said level detector means to provide said first output signal.

4. A data entry device according to claim 2 further including signal producing means for producing signals at a predetermined frequency, bridge drive means connected to said signal producing means for supplying drive signals having said predetermined frequency to each of said bridge means.

5. A data entry device according to claim 4 further including inhibit means responsive to said level detector means for inhibiting operation of said scanner means when said level detector means detects a signal amplitude representative of an unbalanced bridge means, said scanner means including counter means providing a count signal indicative of the bridge means being scanned, said output means being responsive to said count signal and to operation of said level detector means to provide said first output signal.

6. A data entry device according to claim 5 wherein said level detector means includes first comparator means for comparing the amplitude of said first signals to a reference signal amplitude, integrator means connected to the output of said first comparator means for integrating the signal from said first comparator, second comparator means for comparing the amplitude of signals from said integrator means to a reference signal amplitude, and first AND gate means responsive to outputs from said first and second comparator means to actuate said inhibit means.

7. A data entry device according to claim 6 wherein said characteristic detector means is a phase detector means and includes second AND gate means responsive to the output of said first comparator means and to the output of said producing means for determining the phase of said input signal.

8. A data entry device according to claim 7 wherein said phase detector means further includes second integrator means for integrating signals passed by said second AND gate means, third comparative means for passing integrated signals from said second integrator means having a predetermined amplitude, and third AND gate means operable to pass signals upon a coincidence of occurrence of signals from said third comparator means and said first AND gate means.

9. A data entry device according to claim 8 wherein said output means includes binary decoder means responsive to said count signal and to the output from said third AND gate means to provide said first output signal indicative of the actuated sensor.

10. A data entry device according to claim 1 further including inhibit means responsive to said level detector means for inhibiting operation of said scanner means when said level detector means detects a signal representative of actuation of one of a pair of sensors, said scanner means including counter means providing a count signal indicative of the input circuit means being scanned, said output means being responsive to said count signal and to operation of said level detector means to provide said first output signal.

11. A data entry device according to claim 10 wherein said level detector means includes first comparator means for comparing the amplitude of said first signals to a reference signal amplitude, integrator means connected to the output of said first comparator means for integrating the signal from said first comparator, second comparator means for comparing the amplitude of signals from said integrator means to a reference signal amplitude, and AND gate means responsive to outputs from said first and second comparator means to actuate said inhibit means.

12. A data entry device according to claim 1 wherein said characteristic detector means is a phase detector means responsive to the phase of said signals.

13. A data entry device according to claim 12 wherein said phase detector means includes first AND gate means responsive to the output of said level detector means and to output of said signal producing means for comparing the phase of said first signal.

14. A data entry device according to claim 13 wherein said phase detector means further includes integrator means for integrating signals passed by said first AND gate means, comparator means for passing integrated signals from said integrator means having a predetermined amplitude, and second AND gate means operable to pass signals upon a coincidence of operation of said level detector means and said comparator means.

15. A data entry device according to claim 14 wherein said output means includes binary decoder means responsive to a count signal from said scanner means and to the output from said second AND gate means to provide an output signal indicative of the actuated sensor.

* * * * *